United States Patent [19]

Shimamura et al.

[11] Patent Number: 4,635,153
[45] Date of Patent: Jan. 6, 1987

[54] MAGNETIC TRANSDUCER HEAD

[75] Inventors: Toshiki Shimamura, Yokohama; Kiyonori Hayakawa, Ebina, both of Japan

[73] Assignee: Sony Corporation, Tokyo, Japan

[21] Appl. No.: 527,464

[22] Filed: Aug. 29, 1983

[30] Foreign Application Priority Data

Aug. 30, 1982 [JP] Japan .............................. 57-150323

[51] Int. Cl.$^4$ ....................... G11B 5/127; G11B 5/187
[52] U.S. Cl. .................................. 360/125; 360/122; 360/110
[58] Field of Search ...................... 360/110, 119–120, 360/122–123, 125

[56] References Cited

U.S. PATENT DOCUMENTS 4,383,284 5/1983 Isshiki ................................. 360/125

FOREIGN PATENT DOCUMENTS 3120549 11/1982 Fed. Rep. of Germany .
57-15211 1/1982 Japan .
57-111817 7/1982 Japan .

*Primary Examiner*—John H. Wolff
*Attorney, Agent, or Firm*—Hill, Van Santen, Steadman & Simpson

[57] ABSTRACT

Magnetic transducer head for perpendicular mode recording is disclosed which comprises a main magnetic pole made of a thin film of soft magnetic material and a pair of guard blocks bonded to the main magnetic pole as a unitary body so as to grip the main magnetic pole from both sides thereof, wherein the guard blocks are each formed of a nonmagnetic material portion extended from a magnetic record medium contact surface to a predetermined position and a magnetic material portion, grooves are formed on bonded boundary surfaces between the nonmagnetic material portions and the magnetic material portions, the grooves for separating auxiliary magnetic pole portions magnetically connected to the main magnetic pole to become auxiliary magnetic poles of a predetermined width from return path portions which become return path of magnetic fluxes from the main magnetic pole, boundary surfaces between the nonmagnetic material portions and the magnetic material portions come apart (diverge away) from the magnetic record medium contact surface at a plane perpendicular to the main magnetic pole formed on a pointed portion of the auxiliary magnetic poles, the grooves are covered with the nonmagnetic material portions over a range from the auxiliary magnetic pole portions to the return path portions and a coil is wound around the main magnetic pole through the grooves.

1 Claim, 26 Drawing Figures

MAGNETIC TRANSDUCER HEAD

BACKGROUND OF THE INVENTION

1. Field of the Invention

The present invention relates generally to magnetic transducer heads and more particularly is directed to a magnetic transducer head for use in a perpendicular mode recording.

2. Description of the Prior Art

In carrying out the high density magnetic recording (short wavelength recording), it is known that the recording according to the magnetization in the thickness direction of a magnetic tape, namely, so-called perpendicular or vertical mode recording is more advantageous than the recording according to the magnetization along the relative moving direction of the magnetic tape to a magnetic transducer head or so-called longitudinal mode recording. The reason for this is that according to the longitudinal mode recording when the wavelength of the recording signal becomes shorter the self-demagnetizing field becomes larger, while according to the perpendicular or vertical mode recording the self-demagnetizing field within the magnetic layer becomes smaller.

As a magnetic transducer head employed in such perpendicular or vertical mode recording, there have been proposed various ones. In the perpendicular mode recording, in order to perform the ideal recording (magnetization), the main component of magnetic field from the magnetic transducer head must be made perpendicular to a magnetic record medium as much as possible. As such magnetic transducer head, there has been proposed, as shown in FIG. 1, an auxiliary magnetic pole excitation type magnetic transducer head h which comprises a main magnetic pole 102 made of, for example, permalloy thin film and an auxiliary magnetic pole 103, which are opposed to each other through a magnetic record medium 101 and in which a coil 104 is wound around the auxiliary magnetic pole 103.

In this case, however, the auxiliary magnetic pole 103 must be placed behind and close to the magnetic record medium 101 so that the practical assembling and the handling such as mounting the magnetic record medium 101 and so on become complicated.

In order to remove such defect, as shown in FIG. 2, there has been proposed such a recording system in which a magnetic record medium 101 formed of a magnetic layer 107 reinforced by a high permeability material layer 106 and formed on a nonmagnetic base 105 is used and in which such a main magnetic pole excitation type single magnetic pole transducer head h is used wherein auxiliary core 108 of high permeability is placed on one or both surfaces of main magnetic pole 102 at the position down from the top of the main magnetic pole 102, namely, at the position down from the contacting surface of the main magnetic pole 102 with the magnetic record medium 101 and the coil 104 is wound around the auxiliary core 108.

In the magnetic transducer head h of such kind, if the distance between the main magnetic pole 102 and the center of the coil 104 is taken as a, the length of the main magnetic pole 102 projecting from the auxiliary core is taken as b and the ratio a/b is selected in a range from 1 to 1.5 ($a/b \simeq 1 \sim 1.5$), it was clarified that the good recording efficiency could be achieved experimentally and theoretically. Also, if the coil 104 is wound around the auxiliary core 108 at the position nearest to its top and the winding diameter thereof is reduced, the recording efficiency is made high and the impedance of the coil 104 can be lowered. The problem is how to make such transducer head in practice.

OBJECTS AND SUMMARY OF THE INVENTION

It is an object of the present invention to provide an improved magnetic transducer head for perpendicular mode recording.

It is another object of the present invention to provide a magnetic transducer head for perpendicular mode recording having improved recording efficiency.

It is a further object of the present invention to provide a magnetic transducer head for perpendicular mode recording having an improved durability.

According to one aspect of the present invention, there is provided a magnetic transducer head for perpendicular mode recording comprising:

a main magnetic pole made of a thin film of soft magnetic material; and a pair of guard blocks bonded to said main magnetic pole as a unitary body so as to grip said main magnetic pole from both sides thereof, wherein said guard blocks are each formed of a nonmagnetic material portion extended from a magnetic record medium contact surface to a predetermined position and a magnetic material portion, grooves are formed on bonded boundary surfaces between said nonmagnetic material portions and said magnetic material portions, said grooves for separating auxiliary magnetic pole portions magnetically connected to said main magnetic pole to become auxiliary magnetic poles of a predetermined width from return path portions which become return path of magnetic fluxes from said main magnetic pole, said boundary surfaces between said nonmagnetic material portions and said magnetic material portions come apart (diverge away) from said magnetic record medium contact surface at a plane perpendicular to said main magnetic pole formed on a pointed portion of said auxiliary magnetic poles, said grooves are covered with said nonmagnetic material portions over a range from said auxiliary magnetic pole portions to said return path portions and a coil is wound around said main magnetic pole through said grooves.

The other objects, features and advantages of the present invention will become apparent from the following description taken in conjunction with the accompanying drawings through which the like references designate the same elements and parts.

DESCRIPTION OF THE PREFERRED EMBODIMENTS

In view of such aspects, the inventor of the present invention has previously proposed a novel magnetic transducer head by a Japanese patent application, application No. 34,243/1982, filed March 4, 1982.

Figure 1:
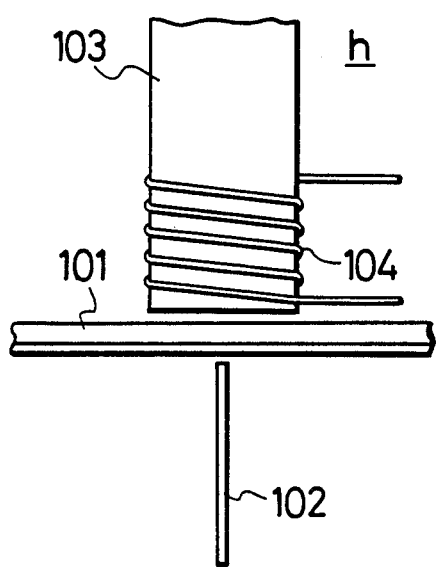
FIGS. 1 and 2 are respectively schematic views showing examples of conventional magnetic transducer heads.
Figure 2:
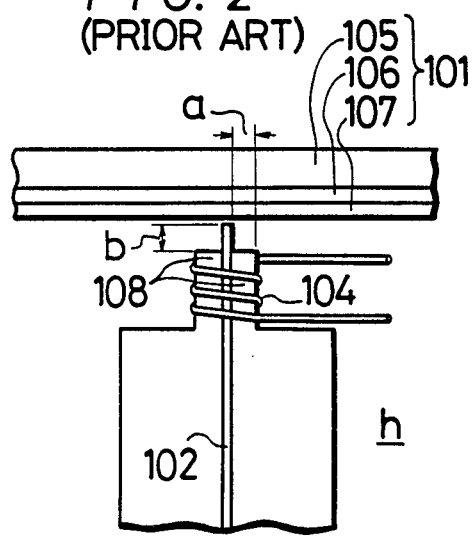
Figure 3A:
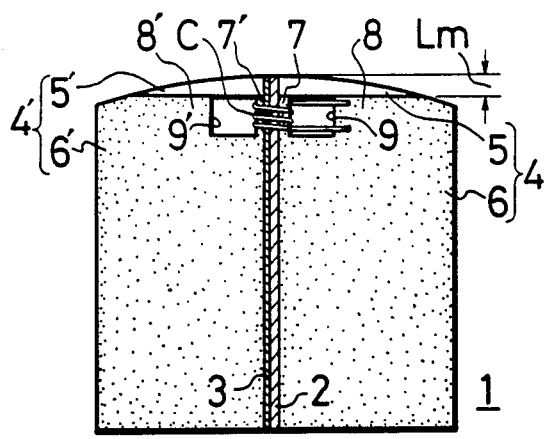
FIGS. 3A and 3B are respectively schematic views showing an example of a magnetic transducer head for perpendicular mode recording used to explain the present invention.
Figure 3B:
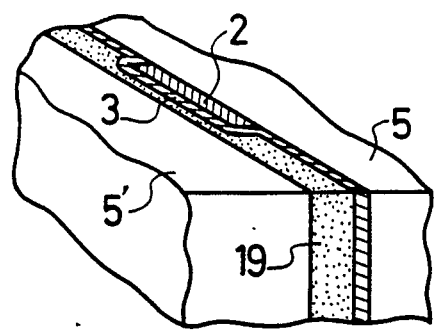

FIGS. 3A and 3B are respectively diagrams generally showing an example of such previously proposed magnetic transducer head 1 for perpendicular mode recording. The magnetic transducer head 1 in this example is formed in such a manner that a main magnetic pole 2 made of thin film of soft magnetic material is bonded with a protection film 3 on its one side surface sandwiched by guard blocks 4 and 4' at its both sides and is integrated therewith. The guard blocks 4 and 4' are respectively formed of nonmagnetic portions 5 and 5' which are extended from the contact surface of the main magnetic pole 2 with the magnetic record medium to the predetermined position and magnetic material portions 6 and 6' bonded to the back of the nonmagnetic material portions 5 and 5'. On the magnetic material portions 6 and 6' are formed auxiliary magnetic poles 7 and 7' bonded to the main magnetic pole 2 around which a coil C is wound and grooves 9 and 9' which divide return path portions 8 and 8' for the magnetic flux generated from the main magnetic pole 2. Within the grooves 9 and 9', the coil C is wound around the main magnetic pole 2 through the auxiliary magnetic poles 7 and 7'.

The manufacturing method of the magnetic transducer head for perpendicular mode recording will be described with reference to FIG. 4.

First, a nonmagnetic plate shape block 11 and a magnetic material block 12 are respectively prepared. The nonmagnetic plate shape block 11 can be made of nonmagnetic ferrite (Zn ferrite), forsterite, fotoceram, crystallized glass, barium titanate, calcium titanate, ceramics of $Al_2O_3$-TiC system and so on. On the other hand, the magnetic material block 12 can be formed of Mn-Zn system ferrite, Ni-Zn system ferrite and so on. These nonmagnetic plate shape block 11 and magnetic material block 12 are desired to have substantially equal thermal expansion coefficient. For this reason, it is desired that the nonmagnetic plate shape block 11 and the magnetic material block 12 are made of nonmagnetic ferrite and magnetic ferrite, respectively. Each surface of the nonmagnetic plate shape block 11 and the magnetic material block 12 is mirror-polished. Then, grooves 13, each having a predetermined spacing therebetween are formed on the mirror-polished surface 12a of the magnetic material block 12. Under this state, the mirror-polished surface 11a of the nonmagnetic plate shape block 11 is faced and then bonded to the mirror-polished surface 12a of the magnetic material block 12. Although the above bonding can be carried out by melt bonding by glass, epoxy adhesive agent or inorganic adhesive agent such as water glass and so on, the melt bonding by glass is desired. In this case, since the melt bonding by glass is sometimes carried out again in the later process, glass having so high melting point as not to be melted by the second melt bonding is employed. Next, a bonded member 15 formed of the nonmagnetic plate shape block 11 and the magnetic material block 12 is cut along the surfaces shown by one-dot chain lines $m_1, m_2, m_3 \ldots$ across the nonmagnetic plate shape block 11 and the magnetic material block 12 to form a plurality of complex plate shape members 16 of a predetermined thickness which then become one guard block 4. Then, one major surface 16a of the plate shape member 16 extending over the nonmagnetic plate shape block portion 11 and the magnetic material block portion 12 is mirror-polished. In this mirror-polishing, in order to raise record/reproduce efficiency, the mirror-polishing is performed in such a manner that the thickness of the auxiliary magnetic pole 7 near the top of the main magnetic pole 2 is formed as a predetermined one and the edge portion of the groove 13 which becomes the separate groove portion 9 is formed as a predetermined shape.

On the mirror-polished surface 16a of the complex plate shape member 16 is deposited a soft magnetic thin film 17 forming the main magnetic pole 2 and having a thickness of, for example, 0.1 to 3 μm made of permalloy, sendust alloy, magnetic amorphous alloy and so on by sputtering, vacuum deposition, ion plating or the like. Then, the magnetic thin film 17 is subjected to the photo-lithography technique such that the main magnetic poles 2 may be located with a necessary track width and spacing. An insulated protection film 18 such as $SiO_2$, $Si_3N_4$, $Al_2O_3$ and so on which will form the protection film 3 is deposited on the magnetic thin film 17 by sputtering, vacuum deposition, ion plating and so on. Thereafter, the complex plate shape member 16', which will become the other guard block 4', manufactured according to the same method as in the aforedescribed complex plate shape member 16 is bonded to the side of the insulated protection film 18. While it is desired that glass is used as an adhesive agent 19 from the viewpoint of improving reliability, inorganic-based adhesive agent such as water glass and so on or organic-based adhesive agent such as epoxy resin and so on can be used.

In this case, it is possible that a groove corresponding to the magnetic thin film 17 which becomes the main magnetic pole 2 is formed in advance on the bonded surface of the other complex plate shape member 16' by, for example, etching and then an adhesive agent is filled into the above groove to bond both of the complex plate shape members 16 and 16' to each other.

Figure 4:
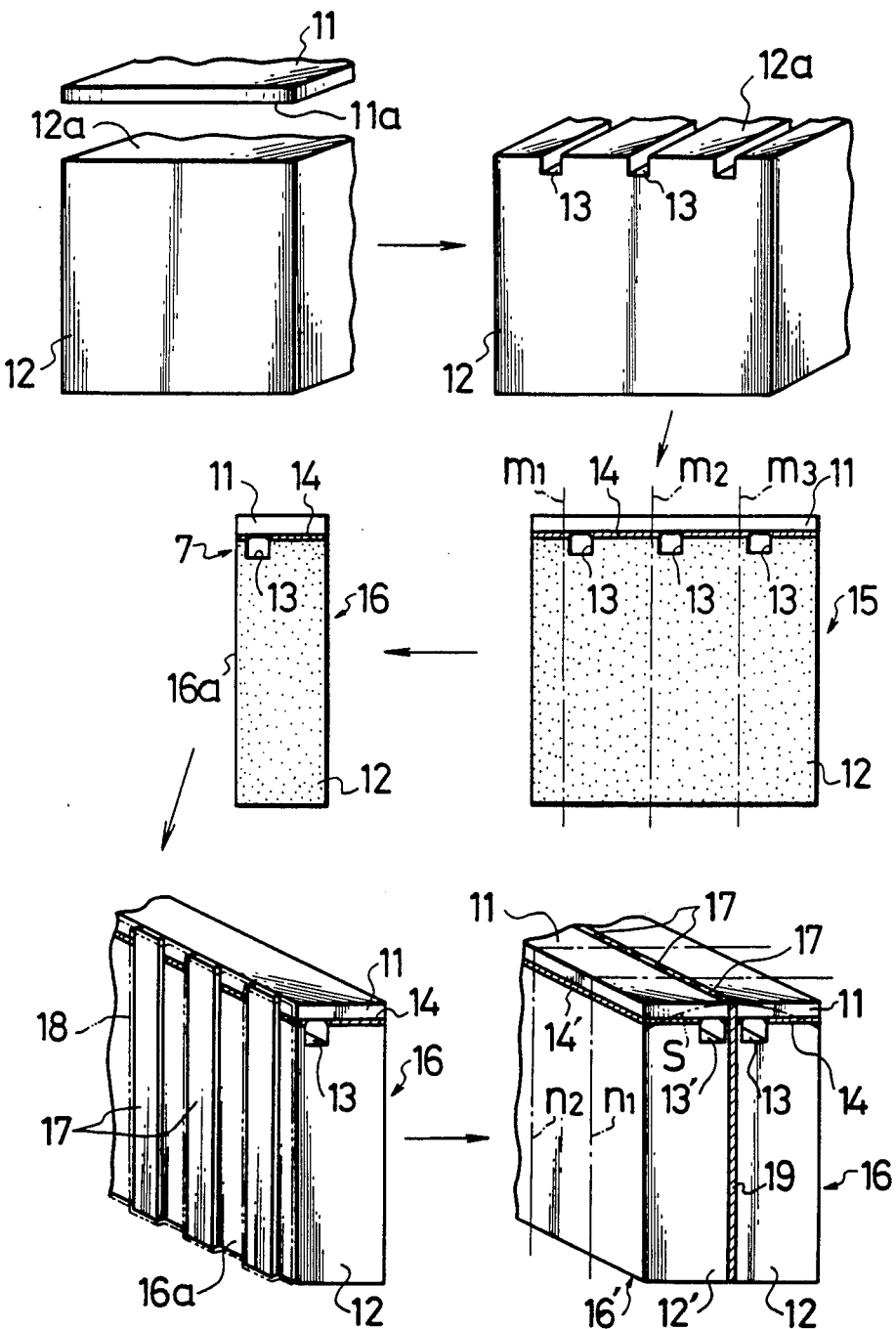
FIG. 4 is a perspective view showing the manufacturing processes of the magnetic transducer head in the example FIGS. 3A and 3B.

As shown by one-dot chain lines $n_1, n_2, \ldots$ in FIG. 4, the bonded member thus made is cut with respect to each magnetic thin film 17 of band shape, bonded to a head mounting base (not shown) and the top surface, namely, the surface side of the nonmagnetic plate shape block 11 is polished in which the contact surface S with the magnetic record medium is formed. Thus, the main magnetic pole 2 formed of the magnetic thin film 17 is provided to face the contact surface S with the magnetic record medium, the nonmagnetic members 5 and 5' are placed at both sides of the top portion of the main magnetic pole 2, and the magnetic members 6 and 6' are placed therebehind. Then, the coil C is wound within the grooves 9 and 9' which are formed on the magnetic members 6 and 6' to divide the auxiliary magnetic poles 7 and 7' from the return path portions 8 and 8' of the magnetic flux from the main magnetic pole 2, thus resulting in the magnetic transducer head 1 according to this example.

Figure 5:
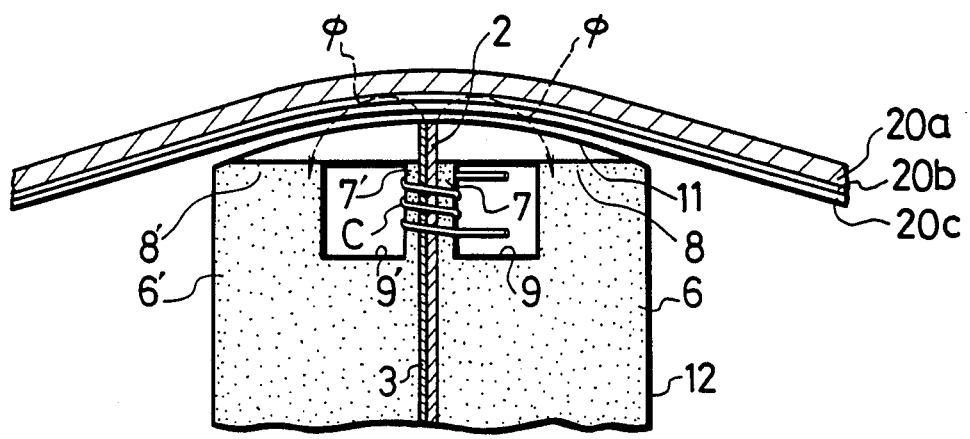
FIG. 5 is a plan view of an enlarged scale useful for explaining the operation of the magnetic transducer head according to the example shown in FIGS. 3A and 3B.

With the magnetic transducer head 1 thus made according to this example, as shown in FIG. 5, the magnetic flux $\phi$ from the main magnetic pole 2 circulates through a magnetic record medium 20 having a magnetic layer 20c reinforced by a high permeability material layer 20b on a nonmagnetic base 20a to the return path magnetic pole portions 8 and 8'.

This magnetic transducer head 1 has the following characteristics.

(1) When the complex block formed of the nonmagnetic material and the magnetic material is produced, the bonding surface is flat so that the mirror polishing can be carried out. Moreover, since the manufacturing accuracy is raised easily, the complex block can be formed quite thin. Furthermore, since the bonding is carried out on the plane, the bonding work is easy with the result that no bubble occurs in the bonded layer, no concave occurs therein and so on. In addition, the configuration of the grooves which are used as the windows for the coil is simple so that the grooves can be formed with ease at one working process.

(2) According to this example, since a number of complex blocks can be produced by one bonding and then cutting, this example is suitable for the mass production.

(3) According to this example, since the auxiliary magnetic pole member is not formed as the plate shape but the large block shape and also the magnetic pole portions opposite to the coil winding window portions, namely, the magnetic pole portions at both sides of the main magnetic pole become the return path magnetic poles for the record/reproduce magnetic field, the record/reproduce efficiency can be improved greatly.

Figure 6:
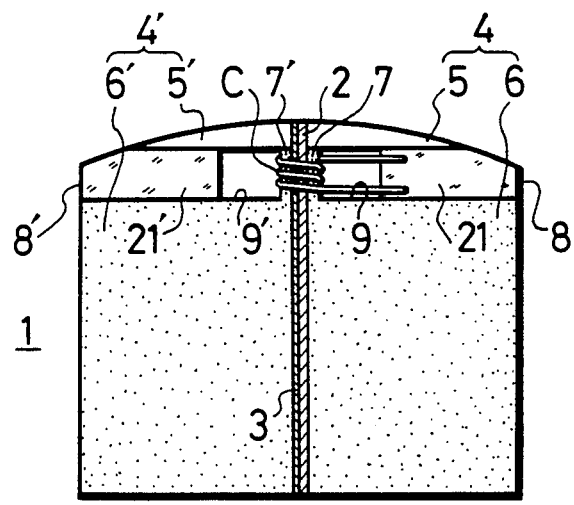
FIG. 6 is a plan view showing another example of the magnetic transducer head used for perpendicular mode recording.
Figure 7:
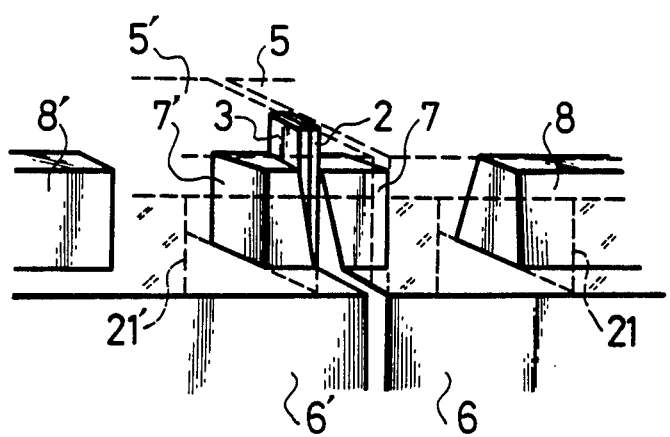
FIG. 7 is a perspective view showing an example of a main part of the example shown in FIG. 6.

There is another example of the magnetic transducer head as shown in FIGS. 6 and 7 in which the width of the auxiliary magnetic pole is made approximately equal to that of the main magnetic pole regardless of the thickness of the magnetic transducer head chip and the impedance of the coil is lowered so that the high frequency drive of the magnetic transducer head can be performed easily.

In the magnetic transducer head 1 according to this example, a protection film 3 is bonded to one surface of a main magnetic pole 2 made of thin film of soft magnetic material, guard blocks 4 and 4' which sandwich the main magnetic pole 2 at both sides thereof are formed of complex members formed of nonmagnetic members 5 and 5' each of which is extended from a magnetic record medium contact surface to a predetermined position and magnetic members 6 and 6', on the bonding boundary between the nonmagnetic members 5 and 5' and the magnetic members 6 and 6' are formed grooves 9 and 9' for separating auxiliary magnetic poles 7 and 7', each of which is magnetically coupled to the main magnetic pole 2 to become auxiliary magnetic poles of a predetermined width from return path magnetic portions 8 and 8', each of which becomes a return path for the magnetic flux from the main magnetic pole 2. Further, in the auxiliary magnetic poles 7 and 7' and the return path magnetic portions 8 and 8', the magnetic members 6 and 6' are replaced by nonmagnetic materials 21 and 21' in accordance with the width of the main magnetic pole 2, and a coil C is wound around the main magnetic pole 2 through the grooves 9 and 9', thus the magnetic transducer head for perpendicular mode recording being formed.

The manufacturing method of the magnetic transducer head for perpendicular mode recording according to this example will be described with reference to FIG. 8.

First, a magnetic block 22 made of, for example, Mn-Zn system ferrite or Ni-Zn system ferrite and so on and a nonmagnetic plate shape member 23 made of, for example, glass ceramics, nonmagnetic Mn system ferrite or the like are prepared. U-shape or trapezoidal shape grooves 24 are formed on one major surface 22a of the magnetic block 22 so as to be made coincident with cut-out spacings which will be described later. Nonmagnetic materials 25 such as glass or the like are filled into these grooves 24. Thereafter, the major surface 22a of the magnetic block 22 as well as the surfaces of the nonmagnetic materials 25 is mirror-polished. Upon this mirror-polishing, it is desired that the depth of the grooves 24 filled with the nonmagnetic material 25 is selected to be approximately the same as or larger than that of the afore-mentioned groove 9 which separates the auxiliary magnetic pole 7 from the return path magnetic portion 8. Also, the width of the groove 24 is selected in such a manner that the exposed width of the magnetic member 22 on the major surface 22a mirror-polished may become equal to or somewhat wider than the track width.

When this groove 24 is formed, it is necessary to carefully prevent the edge portion of the magnetic member 22 from being cracked. If there is a possibility of cracking, the width of the groove 24 has to be reduced in a range of causing no crackings.

Then, on the major surface 22a of the magnetic block 22 are formed grooves 26, which become the above separated grooves 9 and 9', with a predetermined spacing therebetween in the direction perpendicular to the grooves 24 filled with the nonmagnetic materials 25. To the major surface 22a is bonded a nonmagnetic plate shape member 23 the major surface 23a of which is mirror-polished. In the bonding of the nonmagnetic plate shape member 23, it is desired to use melt-bonding glass of high temperature such that the glass as the nonmagnetic material 25 filled into the groove 24 is not melted. Moreover, it is also possible to employ inorganic system adhesive agent such as water glass and organic system adhesive agent such as epoxy resin or the like.

After the magnetic block 22 and the nonmagnetic plate shape member 23 are bonded to each other as described above, the bonded member is cut out along the surfaces shown by one-dot chain lines $m_1, m_2, m_3, \ldots$ so as to form a plurality of complex plate shape members 27 which become one guard block 4. Next, a main magnetic pole forming surface 27a extending from the magnetic block portion 22 of this complex plate shape member 27 to the nonmagnetic plate shape portion 23 is mirror-polished. Finally, on the mirror-polished surface 27a is deposited a soft magnetic thin film 28, which is made of permalloy, sendust alloy, magnetic amorshous alloy or the like having the thickness ranging, for example, from 0.1 to 3 $\mu$m to form the main magnetic pole 2 by sputtering, vacuum deposition, ion plating and so on. Then, the magnetic thin film 28 is partially removed by, for example, photo-lithography to be parallel band with a predetermined track width and spacing therebetween. In this case, each of the band shape magnetic thin films 28 is located such that it may be positioned between the grooves 24 of the magnetic block portion 22 filled with the nonmagnetic material 25, namely, on the auxiliary magnetic pole portion. An insulating protective layer 29 such as $SiO_2$, $Si_3N_4$, $Al_2O_3$ and so on, which becomes the protection film 3 is deposited on the band shaped magnetic thin films 28 and the major surface 27a of the complex plate shape member 27. Then, a complex plate shape member 27' formed in the same way as the complex plate shape member 27 to become the other guard block 4' is prepared. The one major surface 27a' thereof is mirror-polished and bonded to the major surface 27a of the complex plate shape member 27 through the insulating protective layer 29. In this case, the auxiliary magnetic pole portion of the other complex plate shape member 27' is opposed to that of one complex plate shape member 27 and bonded thereto so as to grip the band shape magnetic thin films 28 therebetween. As shown by one-dot chain lines $n_1, n_2, n_3, \ldots$, the bonded complex plate shaped members are then cut out with respect to each of the band shape magnetic thin films 28 and the top surface thereof is polished at which the contact surface with the magnetic record medium is formed. Thus, according to the magnetic transducer head 1 shown in FIGS. 6 and 7 thus made, the main magnetic pole 2 is provided to face its contact surface with the magnetic record medium, the nonmagnetic portions 5 and 5' are placed at both sides of the top portion of the main magnetic pole 2, and the auxiliary magnetic poles 7 and 7' held by the nonmagnetic portions 21 and 21' in accordance with the width of the main magnetic pole 2 and the magnetic portions 6 and 6' having the magnetic flux return path portions 8 and 8' are placed therebehind.

Figure 9:
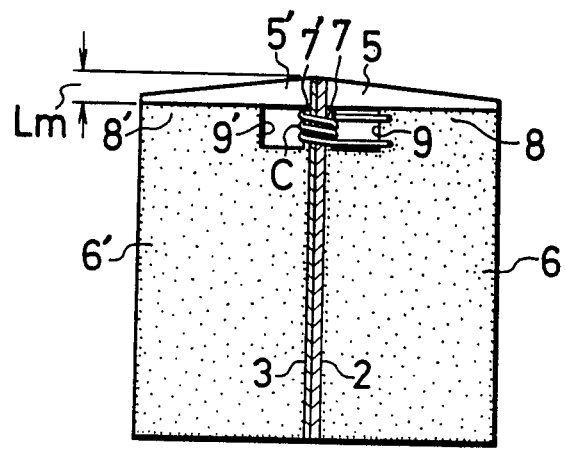
FIG. 9 is a plan view showing other example of the magnetic transducer head used for perpendicular mode recording.
Figure 10:
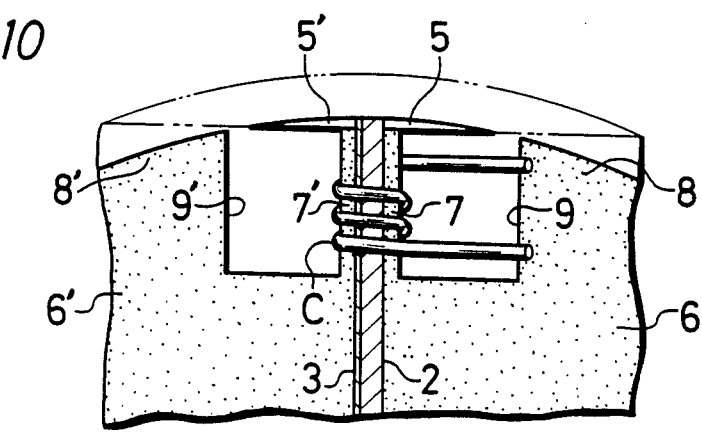
FIGS. 10 and 11 are respectively views useful for explaining the present invention.
Figure 11:
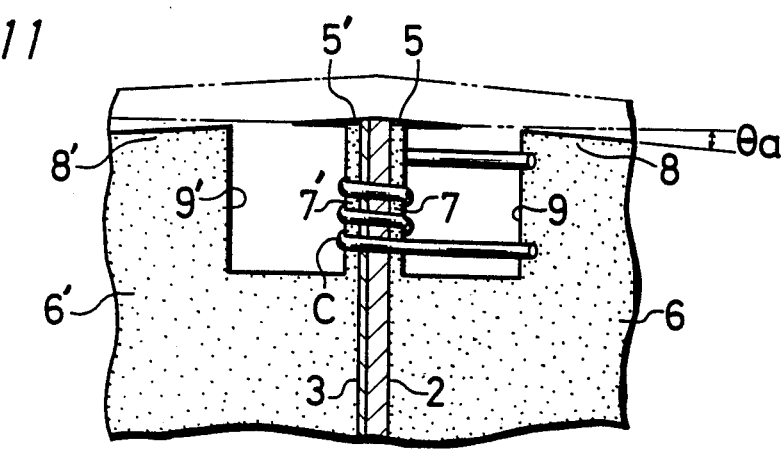

By the way, one of the constants for determining the record/reproduce efficiency of the magnetic transducer head is the main magnetic pole length Lm (refer to FIG. 3A). If the main magnetic pole length Lm is decreased, the record/reproduce efficiency can become better. Also, generally, in a contact type magnetic transducer head, in order to reduce the spacing between the magnetic record medium and the magnetic transducer head, namely, in order to make a better contact of the magnetic transducer head with the magnetic record medium, the contact surface of the magnetic transducer head with the magnetic record medium is formed as the cylindrical shape according to the previously proposed example as mentioned above or a spire type shape as shown in FIG. 9. When the main magnetic pole length Lm is merely reduced for the purpose of improving the record/reproduce efficiency more, the thickness of each of the nonmagnetic portions 5 and 5' are decreased and the bonded area thereof to the magnetic portions 6 and 6' is decreased. Furthermore, the lateral width of the grooves 9 and 9' for coiling becomes larger than that of the nonmagnetic portions 5 and 5' and then is opened, resulting in a problem of poor strength. For example, when the length Lm of the main magnetic pole 2 was selected to be 25 $\mu$m and the shape of the contact surface was selected to be a cyclindrical shape having a radius of 3 mm as shown in FIG. 10 or when the length Lm of the main magnetic pole 2 was selected to be 25 $\mu$m and the shape of the contact surface was selected to be a spire type having an angle $\theta a$ equal to 4°, the grooves 9 and 9' were opened so that the strength of the nonmagnetic portions 5 and 5' was small, the cracks occurred, the durability of the magnetic transducer head became poor and the magnetic record medium was damaged. Furthermore, although under this state the force received by the contact surface of the magnetic transducer head is supported by the auxiliary magnetic poles 7 and 7', the thickness of the auxiliary magnetic poles 7 and 7' is about 200 $\mu$m ($2 \times T_f$ where $T_f$ represents the thickness of the auxiliary magnetic pole 7 or 7') and the strength thereof is poor. Thus, there is then a possibility that the auxiliary magnetic poles 7 and 7' may be broken. Thus, when the record/reproduce efficiency was raised, there occurred a problem of poor durability.

Therefore, according to the present invention, magnetic transducer head for perpendicular mode recording is formed of a main magnetic pole made of a thin film of soft magnetic material and a pair of guard blocks bonded to the main magnetic pole as a unitary body so as to grip the main magnetic pole from both sides thereof, wherein the guard blocks are each formed of a nonmagnetic material portion extended from a magnetic record medium contact surface to a predetermined position and a magnetic material portion, grooves are formed on bonded boundary surfaces between the nonmagnetic material portions and the magnetic material portions, the grooves for separating auxiliary magnetic pole portions magnetically connected to the main magnetic pole to become auxiliary magnetic poles of a predetermined width from return path portions which become return path of magnetic fluxes from the main magnetic pole, the boundary surfaces between the nonmagnetic material portions and the magnetic material portions come apart from the magnetic record medium contact surface at a plane perpendicular to the main magnetic pole formed on a pointed portion of the auxiliary magnetic poles, the grooves are covered with the nonmagnetic material portions over a range from the auxiliary magnetic pole portions to the return path portions and a coil is wound around the main magnetic pole through the grooves. Thus, the magnetic transducer head having satisfactory strength and high record/reproduce efficiency can be obtained.

Figure 12:
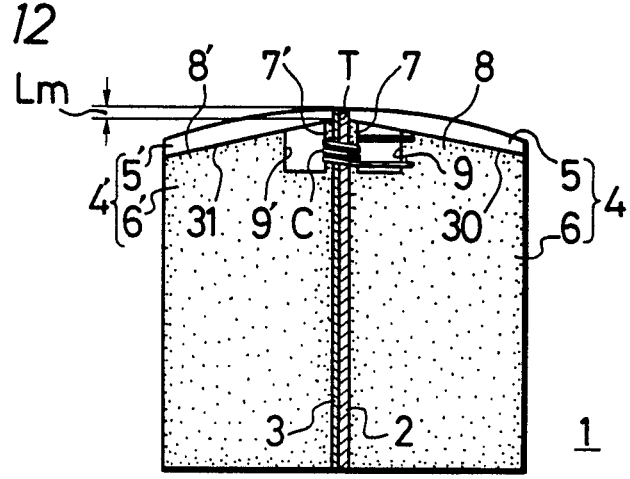
FIG. 12 is a plan view showing an embodiment of the magnetic transducer head according to the present invention.

An embodiment of the present invention will hereinafter be described with reference to FIG. 12. In FIG. 12, like parts corresponding to those of FIGS. 3A and 3B are marked with the same references and will not be described in detail. According to the present invention, as shown in FIG. 12, bonding boundary surfaces 30 and 31 between the nonmagnetic portions 5 and 5' and the magnetic portions 6 and 6' are formed such that they come apart from the contact surface of the head and from the plane perpendicular to the main magnetic pole 2 formed at the pointed, or spire-shaped top portion T of the auxiliary magnetic poles 7 and 7', namely, downward and away, as shown in FIG. 12. In this case, the grooves 9 and 9' are covered with the nonmagnetic portions 5 and 5' over the auxiliary magnetic poles 7 and 7' to the magnetic return path portions 8 and 8'. Other portions are constructed in the same way as in the example shown in FIGS. 3A and 3B.

Figure 13:
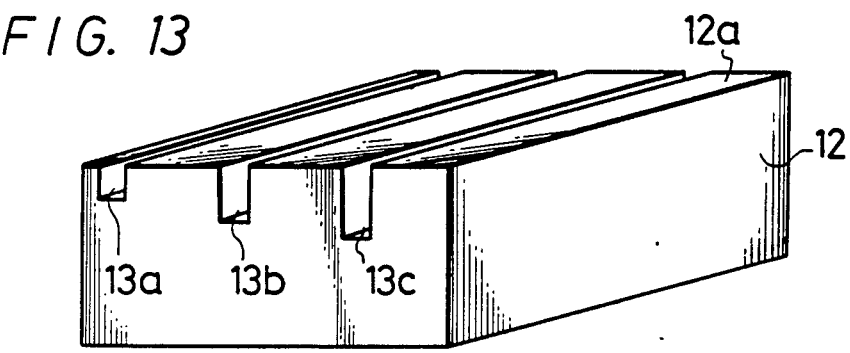
FIGS. 13, 14 and 15 are respectively perspective views illustrating examples of main parts in the manufacturing process of the embodiment of the magnetic transducer head shown in FIG. 12.
Figure 14:
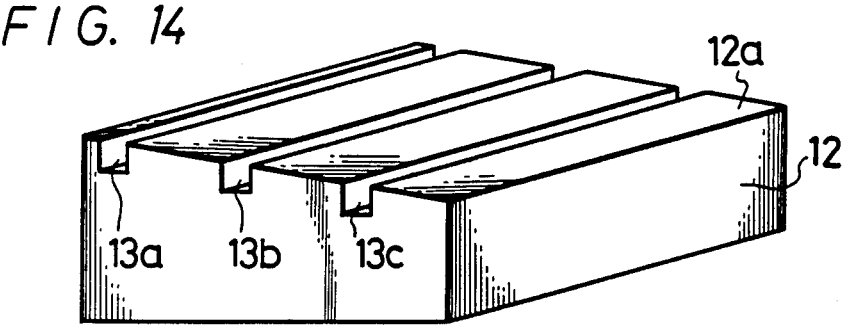
Figure 15:
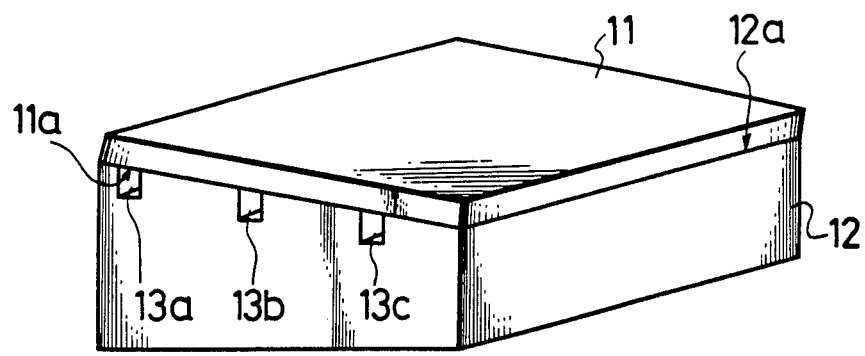

The manufacturing process of this embodiment will hereinafter be described with reference to FIGS. 13 to 15. Throughout FIGS. 13 to 15, like parts corresponding to those of FIG. 4 are marked with the same references and will not be described in detail. On the mirror-polished surface 12a of the magnetic block 12 which is already subject to the plane-polishing with a certain angle, are formed grooves 13a, 13b and 13c which have depths increased sequentially by a predetermined length. Then, as shown in FIG. 14, the major surface 12a is subjected to the plane-polishing having a predetermined angle, for example, the rightward-down inclination of 10°. This angle determines an angle $\theta$ under which the boundary surfaces 30 and 31 between the nonmagnetic portions 5 and 5' and the magnetic portions 6 and 6' shown in FIG. 12 come apart from the contact surface and from the plane perpendicular to the main magnetic pole 2 formed at the pointed top portion T of the auxiliary magnetic poles is determined. Then, as shown in FIG. 15, the mirror-polished surface 11a of the nonmagnetic plate shape block 11 is bonded to the mirror-polished surface 12a of the magnetic block 12 in such a manner that the grooves 9 and 9' are covered with the nonmagnetic materials 5 and 5' over the range from the auxiliary magnetic poles 7 and 7' to the return path portions 8 and 8'. Then, the member thus made is subjected to the similar process to FIG. 4 such as cutting, photo lithography and so on, the magnetic transducer head shown in FIG. 12 can be obtained in which case the above retarded angle $\theta$ is selected to be 10° and the main magnetic pole length Lm is reduced as 25 μm.

As described above, according to this embodiment, unlike the prior art magnetic transducer head, the boundary surfaces 30 and 31 between the nonmagnetic portions 5 and 5' and the magnetic portions 6 and 6' are made apart from the contact surface and from the plane perpendicular to the main magnetic pole 2 formed in the pointed top portion T of the auxiliary magnetic poles at the angle of 10° and the grooves 9 and 9' are covered with the nonmagnetic portions 5 and 5' over the range from the auxiliary magnetic poles 7 and 7' to the return path portions 8 and 8'. There is then an advantage that the magnetic transducer head can be obtained in which the main magnetic pole length Lm can be reduced as 25 μm, the grooves 9 and 9' are not opened as in the previously proposed example, the record/reproduce efficiency is satisfactory and the durability is also satisfactory.

Figure 16:
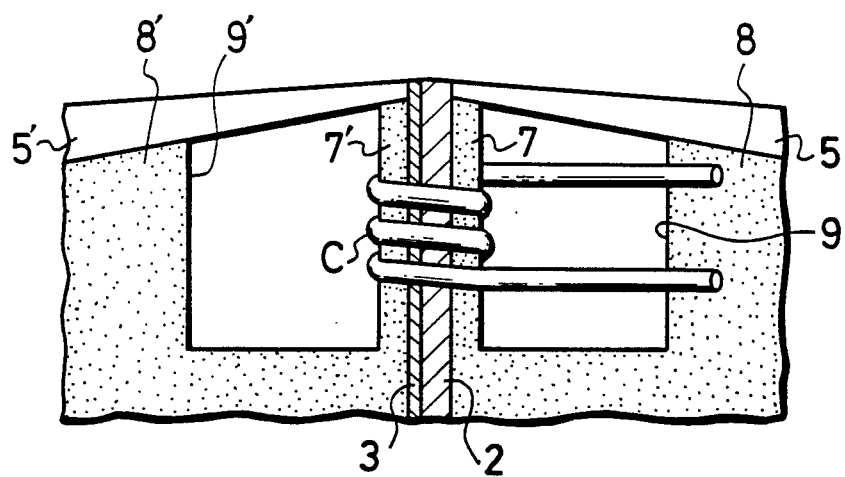
FIGS. 16, 17, 21 and 25 are respectively plan perspective views showing other embodiments of the magnetic transducer head according to the present invention.

Moreover, it can easily be understood that if the contact surface according to this embodiment is formed as not the cylindrical type as shown in FIG. 12 but as the pointed top portion type as shown in FIG. 16, the same action and effect as those of this embodiment can be achieved.

Figure 17:
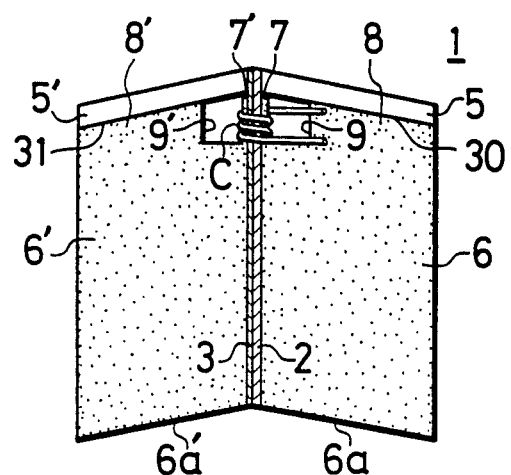
Figure 18:
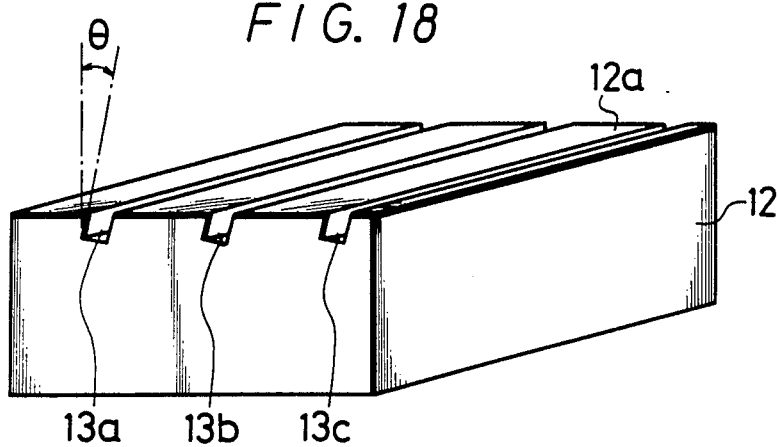
FIGS. 18, 19 and 20 are respectively perspective views illustrating examples of main parts in the manufacturing process of the embodiment of the magnetic transducer head shown in FIG. 17.

FIG. 17 shows other embodiment of the magnetic transducer head according to the present invention. In FIG. 17, like parts corresponding to those of FIG. 12 are marked with the same references and will not be described in detail.

Figure 19:
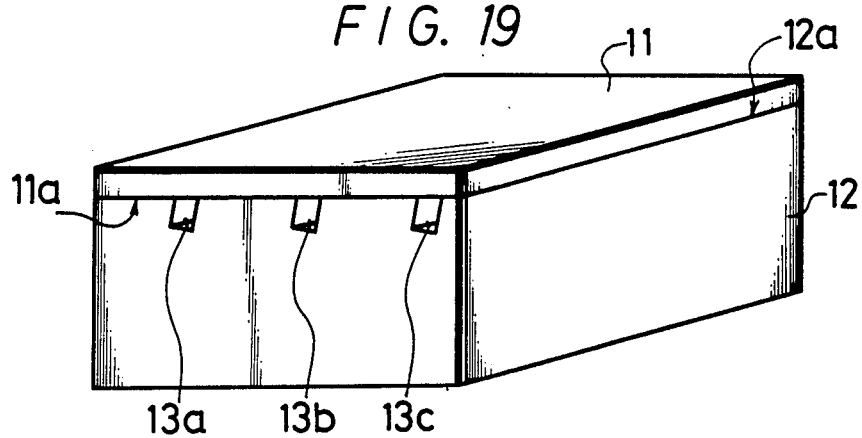
Figure 20:
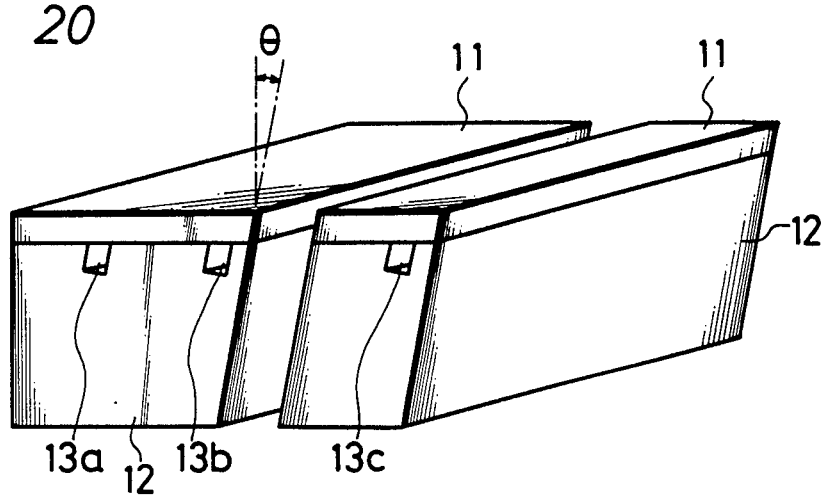

This embodiment is a magnetic transducer head obtained by forming grooves with a certain angle or the mirror-polished surface of the magnetic block. In this embodiment, the angled and grooved manufacturing process is performed first in which the grooves 13a, 13b and 13c which will be formed on the mirror-polished surface 12a of the magnetic block 12 are inclined by 10°. Then, as shown in FIG. 19, after the mirror-polished surface 11a of the nonmagnetic plate shape block 11 is opposed to the mirror-polished surface 12a of the magnetic block 12 at a predetermined position and then bonded together. Then, the bonded member is inclined by 10° by the angled jig and cut out as shown in FIG. 20. And, the same manufacturing process as in the embodiment shown in FIG. 12 is followed hereinbelow.

The magnetic transducer head 1 according to this embodiment is the same as that in the embodiment shown in FIG. 12 except the fact that as shown in FIG. 17, one side surfaces 6a and 6a' of the magnetic portions 6 and 6' opposite to the tape contact surface are inclined by 10° and the above tape contact surface is formed as the spire top portion type. Therefore, it can easily be understood that this embodiment can achieve the same action and effect as those of the embodiment shown in FIG. 12.

Figure 21:
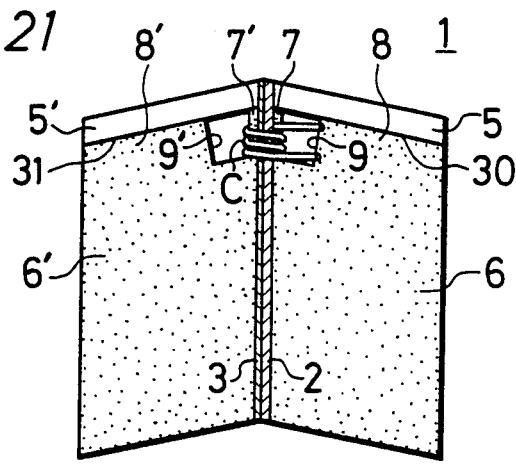
Figure 22:
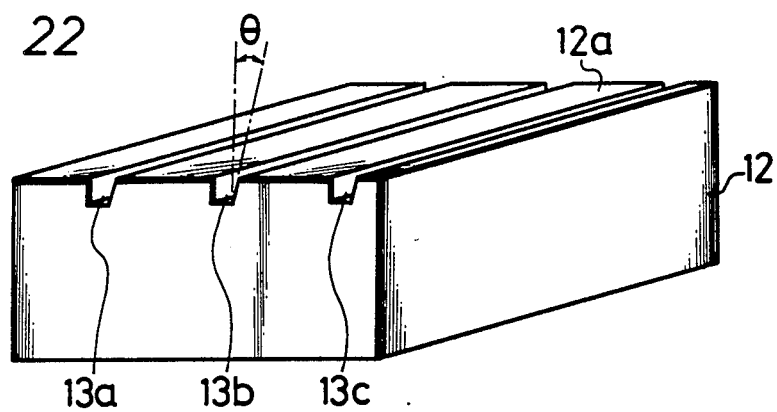
FIGS. 22, 23 and 24 are respectively perspective views illustrating examples of main parts in the manufacturing process of the embodiment of the magnetic transducer head shown in FIG. 21.
Figure 23:
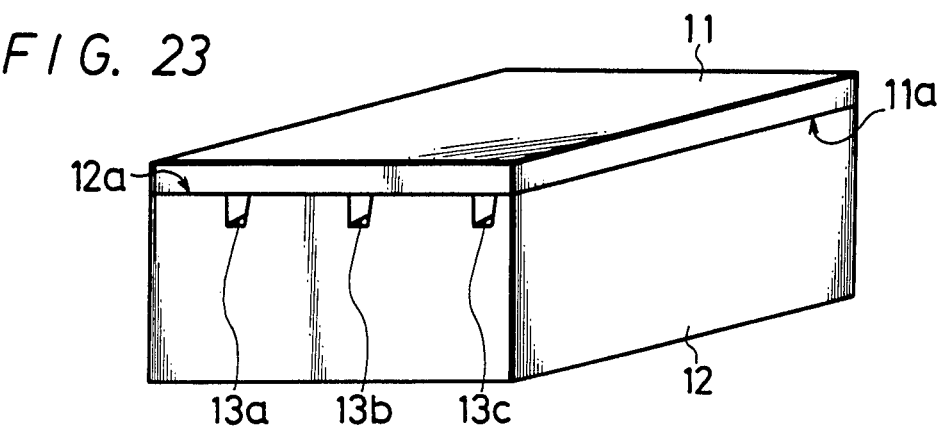
Figure 24:
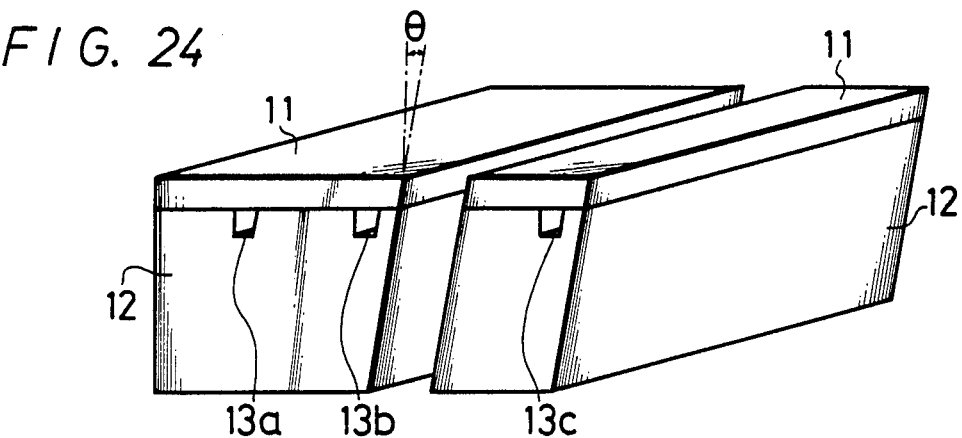

FIG. 21 shows a further embodiment of the magnetic transducer head according to the present invention. In this embodiment, the grooved manufacturing process is performed by the use of a grinder angled by 10° (FIG. 22). After the mirror-polished surface 11a of the nonmagnetic plate shape block 11 is opposed to the mirror-polished surface 12a of the magnetic block 12 at a predetermined position and then bonded together as shown in FIG. 23, the bonded member is inclined by the angled jig and cut out as shown in FIG. 24. And, the same manufacturing process as in the embodiment shown in FIG. 12 is followed hereinbelow. Thus, it can easily be understood that this embodiment shown in FIG. 21 can achieve the same action and effect as those of the embodiment shown in FIG. 12.

Figure 25:
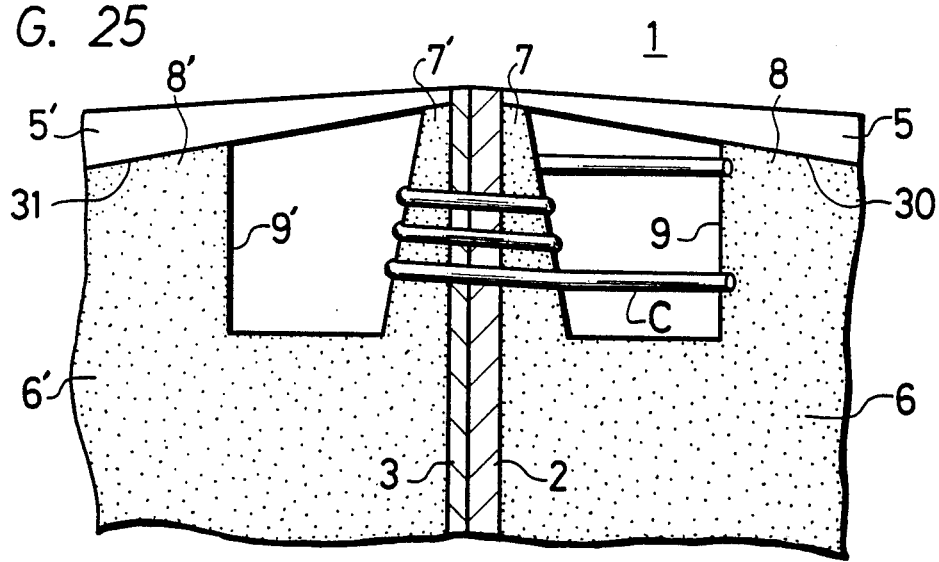

FIG. 25 shows a still further embodiment of the magnetic transducer head according to the present invention. The magnetic transducer head according to this embodiment is the same as that in the embodiment shown in FIG. 12 except the fact that the thickness of the auxiliary magnetic poles 7 and 7' is being decreased as the magnetic transducer head comes closer to the top thereof. Thus, it can easily be understood that the same action and effect as those in the embodiment in FIG. 12 can be achieved.

Figure 8:
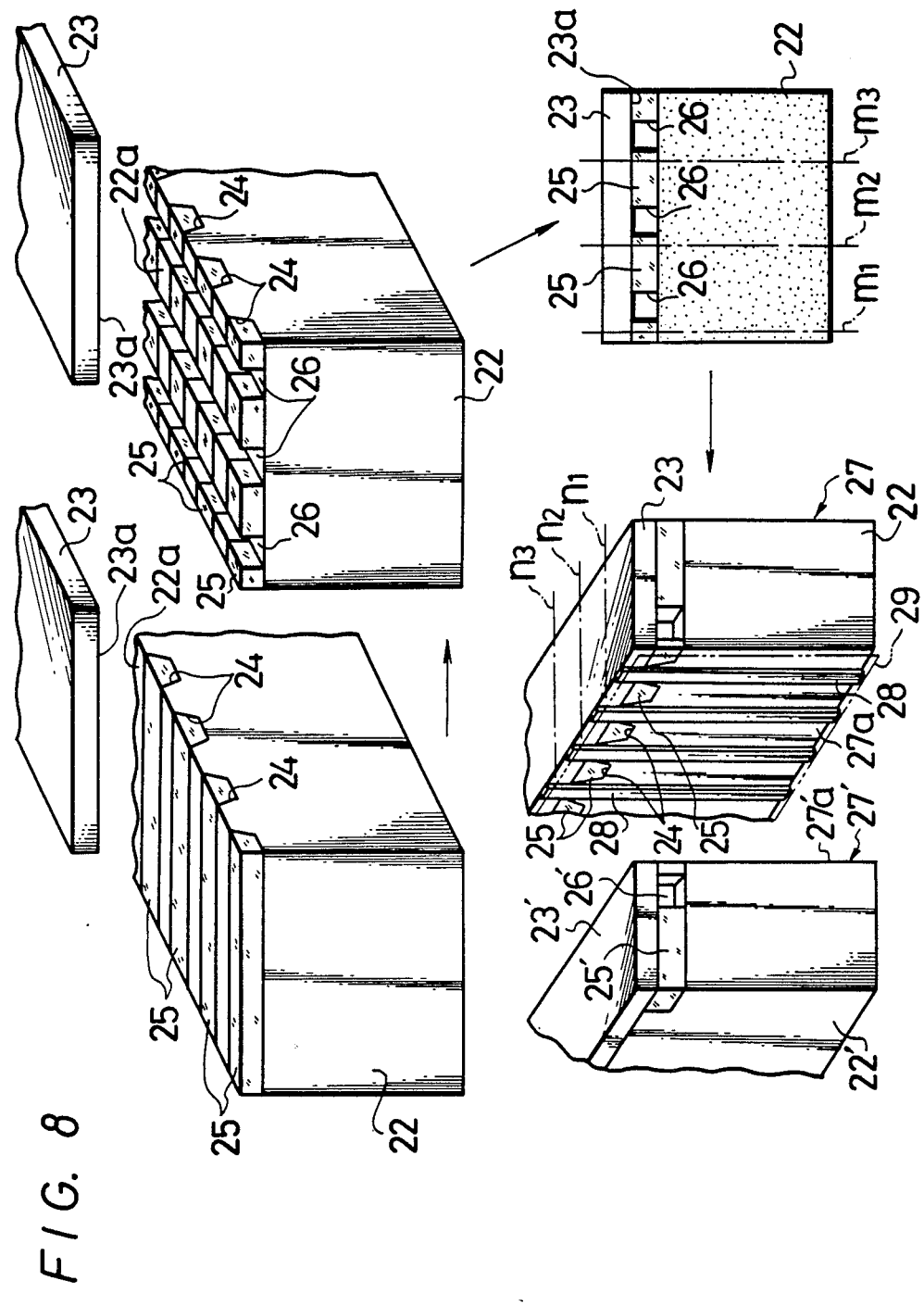
FIG. 8 is a perspective view illustrating the manufacturing process of the magnetic transducer head according to the example shown in FIG. 6.

Furthermore, in the afore-said embodiments, it is possible that as shown in the examples shown in FIGS. 6 to 8, the width of the main magnetic pole and the width of the auxiliary magnetic pole are selected to be approximately the same regardless of the thickness of the magnetic transducer head.

As set forth above, according to the present invention, there is an advantage that the magnetic transducer head having excellent strength and high record/reproduce efficiency can be obtained.

The above description is given on the preferred embodiments of the invention, but it will be apparent that many modifications and variations could be effected by one skilled in the art without departing from the spirits or scope of the novel concepts of the invention, so that the scope of the invention should be determined by the appended claim only.

We claim as our invention:

1. Magnetic transducer head for perpendicular mode recording comprising:
   a main magnetic pole made of a thin film of soft magnetic material; and
   a pair of guard blocks bonded to said main magnetic pole as a unitary body so as to grip said main magnetic pole from both sides thereof, wherein said guard blocks are each formed of a nonmagnetic material portion extended from a magnetic record medium contact surface to a predetermined position, and a magnetic material portion, grooves are formed on bonded boundary surfaces between said nonmagnetic material portions and said magnetic material portions, and spaced from the main magnetic pole by the width of an auxiliary magnetic pole portion, said grooves separating auxiliary magnetic pole portions magnetically connected to said main magnetic pole to become auxiliary magnetic poles of a predetermined width, from return path portions which become the return path of magnetic fluxes from said main magnetic pole, said boundary surfaces between said nonmagnetic material portions and said magnetic material portions diverge away from the plane of said magnetic record medium contact surface and from the plane perpendicular to said main magnetic pole at a pointed portion of said auxiliary magnetic poles adjacent the main pole, said grooves being bridged with said nonmagnetic material portions over a range from said auxiliary magnetic pole portions to said return path portions, and a coil is wound around said main magnetic pole through said grooves.

* * * * *